US007571694B2

(12) United States Patent
Boerner

(10) Patent No.: US 7,571,694 B2
(45) Date of Patent: Aug. 11, 2009

(54) OCCUPANCY INDICATION DEVICE AND METHOD

(76) Inventor: Rick Boerner, 12881 NW. Jackson Quarry Rd., Pillsborough, OR (US) 97124

( * ) Notice: Subject to any disclaimer, the term of this patent is extended or adjusted under 35 U.S.C. 154(b) by 145 days.

(21) Appl. No.: 11/687,537

(22) Filed: Mar. 16, 2007

(65) Prior Publication Data

US 2008/0224858 A1 Sep. 18, 2008

(51) Int. Cl.
*G01D 5/12* (2006.01)
*G09F 19/04* (2006.01)

(52) U.S. Cl. .......................... 116/204; 116/307; 40/459

(58) Field of Classification Search ................. 116/200, 116/204, 306, 307; 292/251.5, 1.5, 137, 292/163; 70/432–434, 441, DIG. 59; 40/331, 40/599, 459, 460
See application file for complete search history.

(56) References Cited

U.S. PATENT DOCUMENTS

| | | | | |
|---|---|---|---|---|
| 369,639 | A * | 9/1887 | Goodhue | 40/459 |
| 590,418 | A * | 9/1897 | Langford | 40/460 |
| 720,871 | A * | 2/1903 | Allen et al. | 40/446 |
| 747,252 | A | 12/1903 | Smith | |
| 1,337,401 | A | 4/1920 | Heberling | |
| 2,315,102 | A * | 3/1943 | Adams | 70/432 |
| 2,565,669 | A | 8/1951 | Smith | |
| 2,586,900 | A * | 2/1952 | Alderman | 292/74 |
| 2,623,310 | A | 12/1952 | Raught | |
| 2,955,368 | A | 10/1960 | Winsett | |
| 3,751,088 | A | 8/1973 | Schlage et al. | |
| 3,919,869 | A | 11/1975 | Fromm | |
| 3,948,067 | A | 4/1976 | Peterson | |
| 3,975,724 | A | 8/1976 | Schultz | |
| 4,262,507 | A | 4/1981 | Flack et al. | |
| 4,312,198 | A | 1/1982 | Sedley | |
| 4,490,999 | A | 1/1985 | Castle et al. | |
| 4,559,796 | A | 12/1985 | De Forrest, Sr. | |
| 4,854,061 | A | 8/1989 | Khoshkish | |
| 4,881,335 | A * | 11/1989 | Khoshkish | 40/449 |
| 4,976,215 | A * | 12/1990 | Lee et al. | 116/215 |
| 5,235,933 | A * | 8/1993 | Pare et al. | 116/204 |
| 5,253,908 | A * | 10/1993 | Leonard, III | 292/289 |
| 5,377,513 | A | 1/1995 | Miyamoto et al. | |
| 5,608,298 | A | 3/1997 | Frolov et al. | |
| 5,861,806 | A * | 1/1999 | Vories et al. | 340/555 |
| 6,135,512 | A * | 10/2000 | Galvin | 292/163 |
| 6,588,811 | B1 | 7/2003 | Ferguson | |
| 6,615,629 | B2 | 9/2003 | Bates et al. | |
| 6,731,200 | B2 | 5/2004 | Wagner et al. | |
| 2006/0144103 | A1 | 7/2006 | Blanch | |

* cited by examiner

*Primary Examiner*—Amy Cohen Johnson
(74) *Attorney, Agent, or Firm*—Leyendecker & Lemire, LLC; Kurt P. Leyendecker

(57) ABSTRACT

An occupancy indicator for a door, and a method of use, one embodiment comprising a magnet a switching apparatus activatable by a person, a signaling device adapted to indicate one of at least two states, and a biasing mechanism. One embodiment may not be comprised of a magnet but may be comprised of a bolt assembly having a plurality of biasing mechanisms. The magnet or bolt assembly, switching apparatus, signaling device, and biasing mechanism are operatively coupled to automatically provide a signaling device state upon the door opening.

11 Claims, 14 Drawing Sheets

OCCUPANCY INDICATION DEVICE AND METHOD

FIELD OF THE INVENTION

This invention generally relates to door signal devices displaying room occupancy status.

BACKGROUND

In many instances, it is necessary to determine whether a closed area is occupied by a person prior to entering that area. One prime example of this is a unisex bathroom—it is often necessary to inform a person whether a unisex bathroom such as a portable toilet or a bathroom on an airplane is occupied prior to the person entering the bathroom. In fact, statutes such as the 2004 Oregon Structural Specialty Code actually require unisex bathrooms to have an occupied indicator in addition to a privacy lock.

It is also necessary in some instances to perform a single operation to open a door and leave an area. In fact, some building codes, such as the 2003 International Building Code, contain a requirement that opening a door should not require more than one operation. A single operation is known to mean pushing open a door to leave an area. More than one operation is known to mean turning a lever or a latch in addition to the operation of pushing on the door to open the door and leave the area.

Prior art occupancy indication devices inadequately provide indication signals for room occupancy while allowing builders to satisfy these type of building code limitations (among others). For example, many prior devices which are installed on unisex bathrooms are not simply room occupancy indicators, but also perform a locking function when operated. Often, these prior art devices lock the occupant inside the room when the "occupied" sign is displayed. This is often undesirable. In non-unisex bathroom settings, as well as some unisex bathroom installations, it is necessary to provide an occupancy indication device which is separate from a door locking mechanism. Additionally, the prior art devices do not allow for a person to exit the area by performing a single operation and still provide the correct occupation status to a person wishing to enter the area. These prior art occupancy indication devices must first be manually signaled to indicate that the area is unoccupied prior to opening the door. It is only after providing the correct signal to a person wishing to enter is the person inside the area capable of leaving the area.

DETAILED DESCRIPTION

Figure 1A:
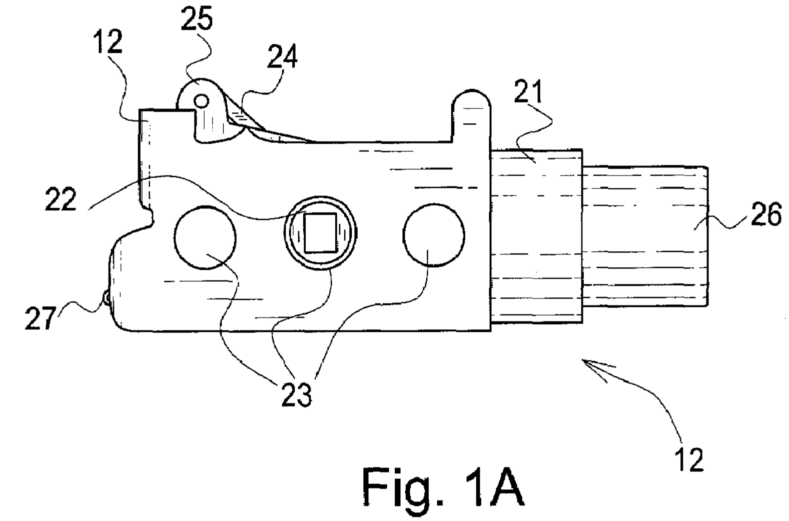
FIG. 1A is a side view of a magnetic bolt assembly in a receded position according to one embodiment of the invention.

One embodiment of the invention enables an occupier of an area with a door to leave the area through the door without first manually signaling an occupancy indication device on the door, yet still provide a correct occupancy signal to a person wishing to enter the area after the prior occupant has left. One version also satisfies recent regulations governing occupancy display signals, so that a single operation will allow a person to both open a door (or any other leaf having an occupancy indicator), as well as provide the correct indication status. Specifically, the occupied indicator allows a person to enter a room, set the correct occupancy indication status (to "occupied", in one embodiment), and upon leaving the room by performing a single motion (pushing the door open in one embodiment), the occupied indicator is automatically reset (to "vacant" in one version).

An occupied indicator may be comprised of an operatively coupled magnet, a signaling device and switching apparatus. The signaling device may be referred to as a signaler and the switching apparatus may be referred to as a switch. Being operatively coupled together, setting the switch to an occupied position may display an occupied status on the signaling device. Turning the switch from a first state such as a vacant position to a second state such as an occupied position in one embodiment also moves the operatively coupled magnet to an extended position. One embodiment's extended magnet position is next to an edge of the door, such as a side edge. The magnet may be held in the extended position by magnetic force between the magnet and a strikeplate set in the doorjamb. Upon opening the door, the magnetic force between the strikeplate and the magnet is lost as the door swings open and swings the magnet away from the strikeplate. With the loss of the magnetic force, the magnet is pulled back to a retracted position away from the edge of the door by a biasing mechanism. One type of biasing mechanism may be a spring.

A version's switching apparatus is a rotatable knob or lever operatively coupled to a plate. The plate has an outer side which is adapted to face away from a door inner surface and into the room when the plate is coupled to a door and the door is closed. The knob may be coupled to the plate outer side, with a knob extension portion fitting within a bore on the plate. The extension portion is operatively coupled to the plate, allowing the knob to rotate around the plate in one embodiment. One version's knob extension portion has a hole in a distal end of the portion, the hole being centered and running longitudinally along the extension portion.

Inserted into the extension portion hole in one embodiment may be a shank second end. The shank extends generally perpendicularly away from the switching apparatus and towards the interior of the door in one embodiment. The shank is operatively coupled to the magnet, and in one embodiment is operatively coupled to a bolt assembly or mechanical linkage having a magnet. A radial bearing may also be operatively coupled to the magnet. The bearing enables the magnet to be generally linearly extended from a retracted position to an extended position. The bearing and magnet may be further coupled to mechanical linkage or a biasing mechanism, with the assemblage being referred to as a bolt assembly. A second end of the shank may operatively couple to the signaling device. In one embodiment, the signaling device is coupled to a door outer surface. The signaling device may have a rotatable signaling device extension hole extending to a door interior that is adapted to receive the shank second end.

The signaling device in one embodiment is capable of displaying at least two different signals, such as, but not limited to, a "vacant" sign and an "occupied" sign. The vacant sign may be displayed when the magnet is in a retracted position and the switch is in a first position such as a vacant position. Upon moving the switch to a second position such as an occupied position, the shank may be rotated as the shank is operatively coupled to the extension hole in one version. If the shank is rotated while it is operatively coupled to the signaling device, the signaling device provides a second signal, such as, but not limited to, moving the "occupied" sign into the correct position. In one embodiment, the occupied sign may be coupled to the rotatable signaling device extension hole through a cam. The cam may enable the occupied sign to be moved into place in front of the vacant sign when the extension is rotated by the shank.

A second embodiment may also have a bolt assembly and may not be comprised of a magnet. The second embodiment may be comprised of biasing mechanisms such as, but not limited to, springs. In such an embodiment, the switching apparatus may be operatively coupled to a connection rod, which in turn is operatively coupled to the bolt assembly. The switch may also be coupled to a shank. When the door is shut and the switch is turned from a first position to a second (and possibly occupied) position, similar to the first embodiment, the shank may provide a correct signal on a signaling device. In one second embodiment, the connection arm and biasing mechanisms correctly position the bolt assembly to an extended position near an edge of the door proximal the door jamb.

Upon releasing the knob or other switch after engagement, one embodiment's correct signal is continually displayed until the door is opened. In one such version, the magnet may be held in the extended position by the magnetic force between the magnet and the strikeplate, thereby continually displaying an occupied sign status. In a second embodiment, the bolt assembly is held in the extended position (and therefore the signal status is held in the correct mode) via a biasing mechanisms coupled to the bolt assembly.

In one second embodiment, the bolt assembly includes a trigger hammer, a portion of which may extend beyond a door edge (such as a side edge) when the door is open. When the door is shut, the hammer may come into contact with the door jamb, pivoting into the door from the edge. As the switch is activated from the first state to the second state, the correct signal may be displayed on the signaling device as the bolt assembly is moved into the extended position. In one second embodiment, the bolt assembly is held in the extended position by one portion of the trigger hammer coupling to a connection arm and another end of the trigger hammer resting against the door jamb. When the door is opened, the trigger hammer can not rest on the door jamb as the door jamb is no longer located proximal the door side edge. Therefore, in one embodiment, a spring forces the trigger hammer to once again extend away from the door edge and at least one other spring pulls the connection arm and the bolt assembly portion back to the retracted position.

In either a first embodiment or a second embodiment, the limitations of the prior art are overcome. Both versions enable a person to use a single motion to open a door, while simultaneously correctly displaying the occupancy status of the room. Additionally, the occupancy indicator versions are not locking devices, thereby overcoming a second limitation of prior art door occupancy indicators.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, tense or any singular or plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of phrases like "in one embodiment", "in an embodiment", or "in a variation" in various places in the specification are not necessarily all meant to refer to the same embodiment or variation.

The term "couple" or "coupled" as used in this specification and the appended claims refers to either an indirect or direct connection between the identified elements, components or objects. Often the manner of the coupling will be related specifically to the manner in which the two coupled elements interact.

The term "integrate" or "integrated" as used in this specification and the appended claims refers to a blending, uniting, or incorporation of the identified elements, components or objects into a unified whole.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

As applicable the term "bolt assembly" as used in this specification and the appended claims refers to a portion of the embodiment which is extended towards a door edge. The term does not required the embodiment to have an actual bolt such as, but not limited to, a bolt similar to a "dead-bolt".

As applicable the term "strikeplate" as used in this specification and the appended claims refers to a portion of a door jamb proximal the bolt assembly or other occupied indicator portion located within the door. The strikeplate may be adapted to create a magnetic force with the magnet in one embodiment.

A FIRST EMBODIMENT OF AN OCCUPIED INDICATOR

Figure 4:
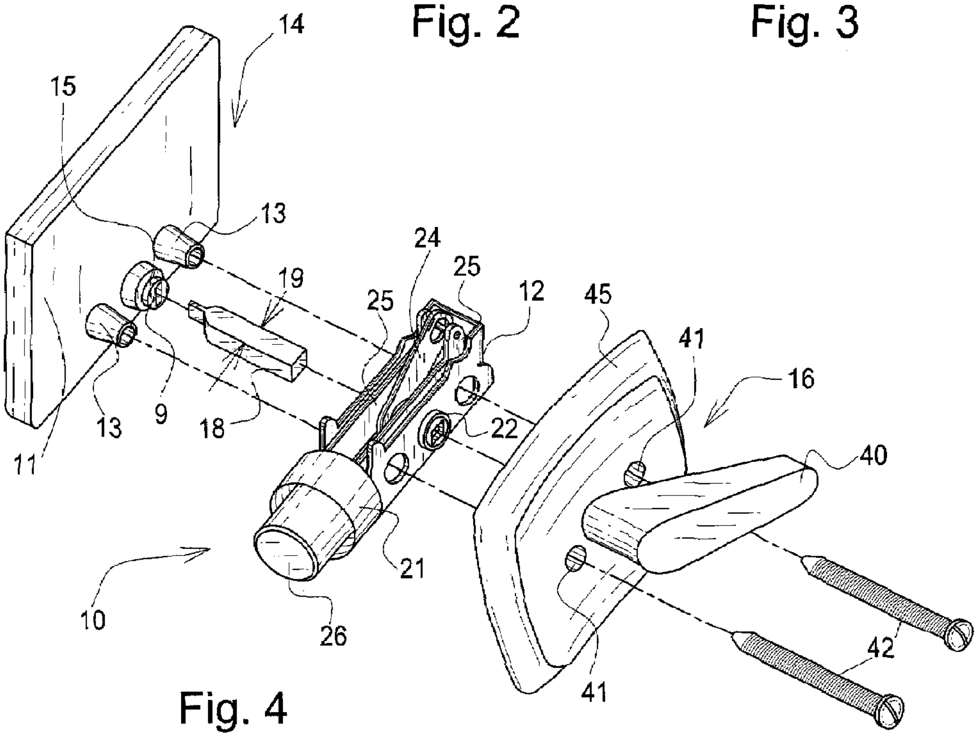
FIG. 4 is an exploded isometric view of an occupied indicator having a magnetic bolt assembly, switching apparatus, and signaling device according to one embodiment of the invention.

As best shown in FIGS. 1A through 4 and 7 through 9, and specifically as best shown in FIG. 4, one embodiment of an occupied indicator 10 may be comprised of a magnet 26, a switching apparatus 16 and a signaling device 14. The magnet may be operatively coupled to a housing 12 which may be generally rectangular in shape, having a housing wall thickness 20 of 1/16 of an inch in one embodiment. The housing may be made of a metal alloy such as steel or brass alloy. Other materials such as, but not limited to, a polymeric or composite material are also contemplated as being used for individual devices within the housing or other devices within different occupied indicator versions. The housing may also include a magnet reception cavity. As the magnet may be a magnetic bolt, the cavity may be referred to as a bolt reception cavity 21 as well.

Figure 1B:
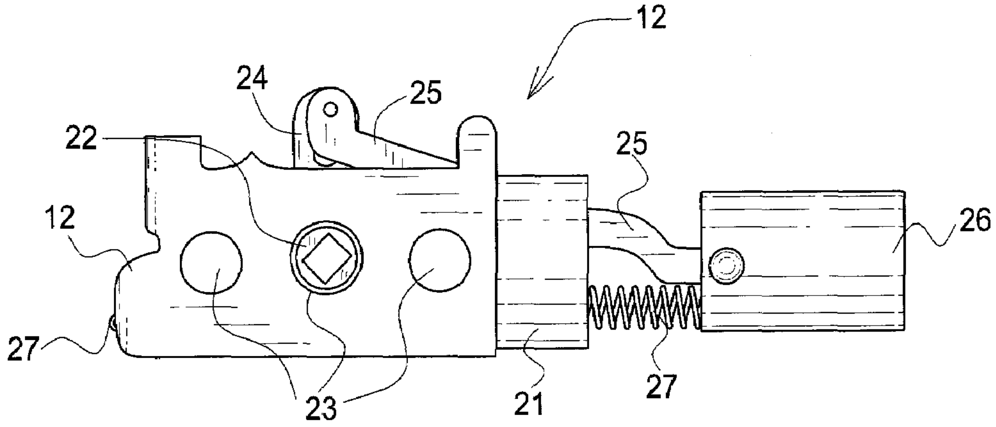
FIG. 1B is a side view of a magnetic bolt assembly in a partially extended position according to one embodiment of the invention.
Figure 1C:
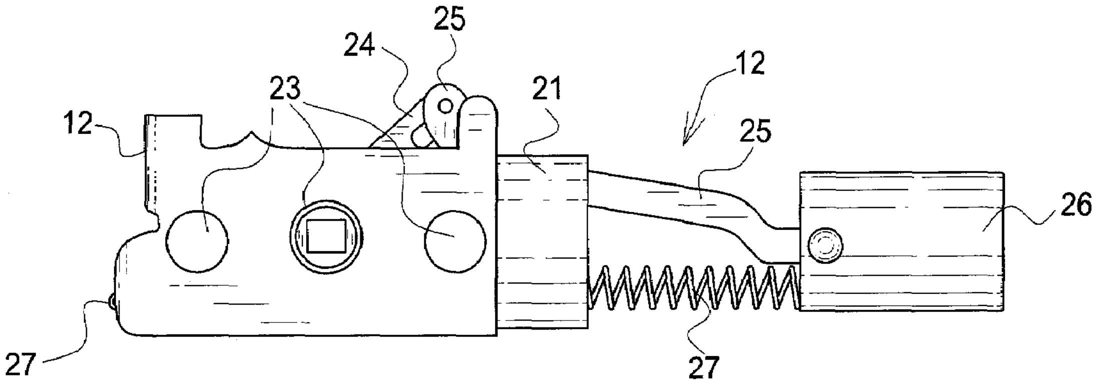
FIG. 1C is a side view of a magnetic bolt assembly in an extended position according to one embodiment of the invention.
Figure 2:
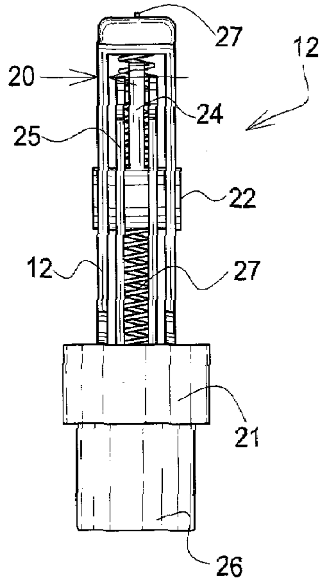
FIG. 2 is a top view of a magnetic bolt assembly in a receded position according to one embodiment of the invention.
Figure 3:
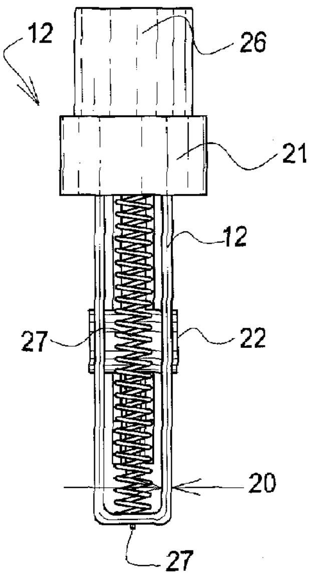
FIG. 3 is a bottom view of a magnetic bolt assembly in a receded position according to one embodiment of the invention.

Included in the housing 12 in one embodiment may be mechanical linkage. A bearing 22 may be included in the mechanical linkage. As best shown in FIGS. 1A through 1C, the housing may have three bores 23, with the bearing in one embodiment generally being a radial bearing coupled to the center bore. The bearing may also be a different type of bearing or integrated to a different bore. Integrated to the bearing in one embodiment is an arm 24. The arm may also be coupled to the bearing in one embodiment. Operatively coupled to an arm end may be at least one lever 25. One embodiment may have two levers on either side of the arm. The levers may be coupled to the arm through a pin, with the pin extending through a bore in the arm and the levers. In one embodiment, the levers are coupled to the arm proximal a first lever end. The housing, mechanical linkage, a biasing mechanism, and magnet may be referred to as a bolt assembly.

As best shown in FIGS. 1B and 1C, a lever second end may be coupled to a magnet 26 through a pin. Also coupled to the magnet may be a biasing mechanism. One type of biasing mechanism which may be used is a compression spring 27, with a first end of the compression spring 27 operatively coupling to the magnet. For example, the spring end may be inserted through a bore in a pin, and wrapped around the pin, with the pin coupled or integrated to the magnet. A second end of the return mechanism such as a compression spring may be coupled to a distal housing portion. The magnet may also be a magnetizable bolt in one embodiment.

Figure 9:
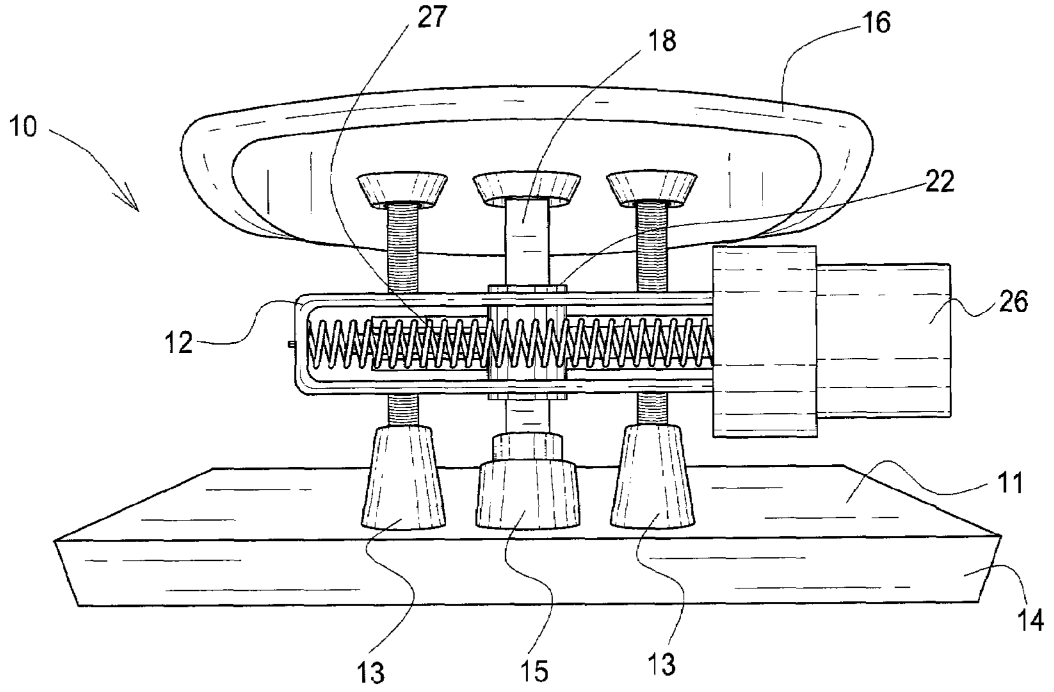
FIG. 9 is a bottom view of an occupied indicator not coupled to a door having a bolt assembly, shank, 2 screws, a switching apparatus, and a signaling device.

Extending through a bore in the bearing 22 in one embodiment is a shank 18, as best shown in FIGS. 4 and 9. A shank middle portion may operatively couple to the bearing. A cross-section of both the bearing bore and the shank may be adapted to ensure that as the shank is turned, the bearing is turned by the shank. For example, as best shown in FIG. 4, if the shank has a generally rectangular cross-section, the bore may have a generally rectangular cross-section as well.

A shank 18 second end may be adapted to operatively couple to the signaling device 14 and a shank first end, opposing the shank second end, may be adapted to operatively couple to the switching apparatus 16. The shank length in one embodiment is about 1.75 inches. The thickness 19 of the shank 18 may decrease proximal to at least one end of the shank. As best shown in FIG. 4, the decreased thickness may enable the shank to more easily and accurately couple to the signaling device 14.

Figure 7:
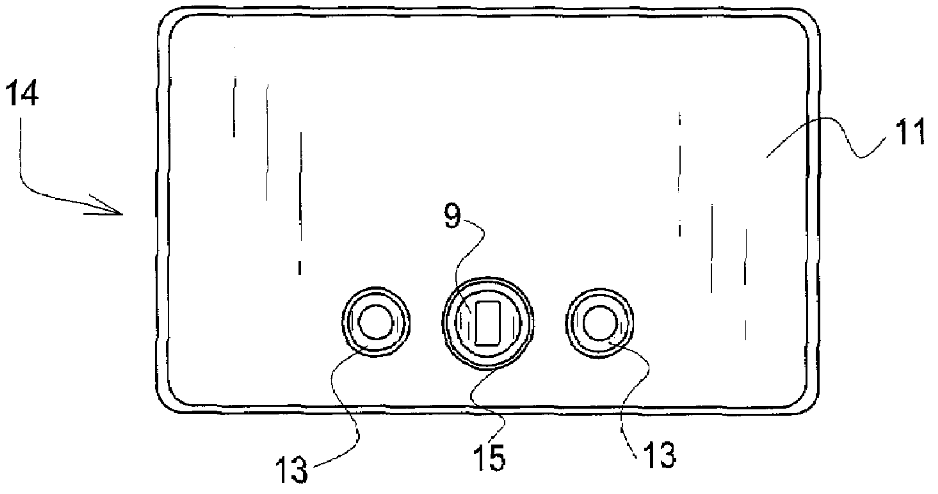
FIG. 7 is a rear view of a signaling device according to one embodiment of the invention.

As best shown in FIGS. 4 and 7, a back side 11 of the signaling device may have an extension portion 15 and at least one coupling mechanism 13. The extension portion may be referred to as a knob extension portion or an extension or even a knob portion extension or portion extension. The back side may be coupled to a door outer surface. One embodiment has a pair of coupling mechanisms. The extension may be a generally cylindrical extension which may have a hole generally located in the center of the extension, the hole extending longitudinally from an extension outer surface 9 inward towards the signaling device interior. The hole is adapted to receive the shank, and may be adapted to receive the end of the shank with a smaller thickness than other portions of the shank.

The coupling mechanisms 13 are adapted to operatively couple to the switching apparatus in one embodiment. The coupling mechanisms may be extensions which have a threaded hole generally centered and running longitudinally along the extension. The threads may be adapted to mate with a bolt 42 inserted through bores 41 in the switching apparatus 16. The bolts may couple the switching apparatus and the signaling device to opposing door sides through a bore.

Figures 5A, 5B, 5C:
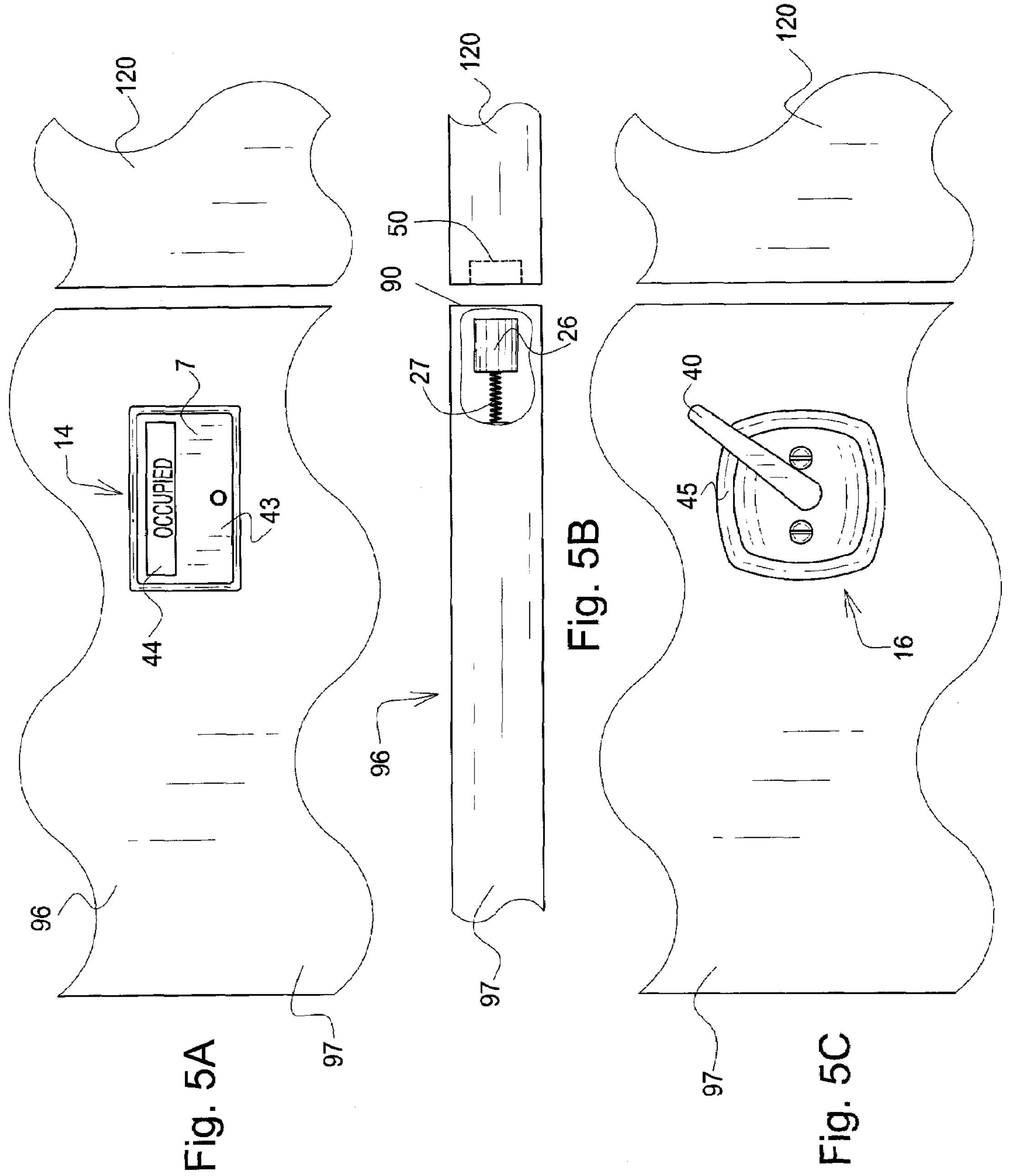
FIG. 5A is a front view of a portion of a doorjamb and a door having an occupied indicator, the door being in a closed position and the signaling device being in an occupied position according to one embodiment of the invention.
FIG. 5B is a top view of a portion of a doorjamb and a door having an occupied indicator, the door being in a closed position and the magnet and the spring being shown in a cut-away in an extended position according to one embodiment of the invention.
FIG. 5C is a rear view of a portion of a doorjamb and a door having an occupied indicator, the door being in a closed position and the knob turned to an occupied position according to one embodiment of the invention.
Figures 6A, 6B, 6C:
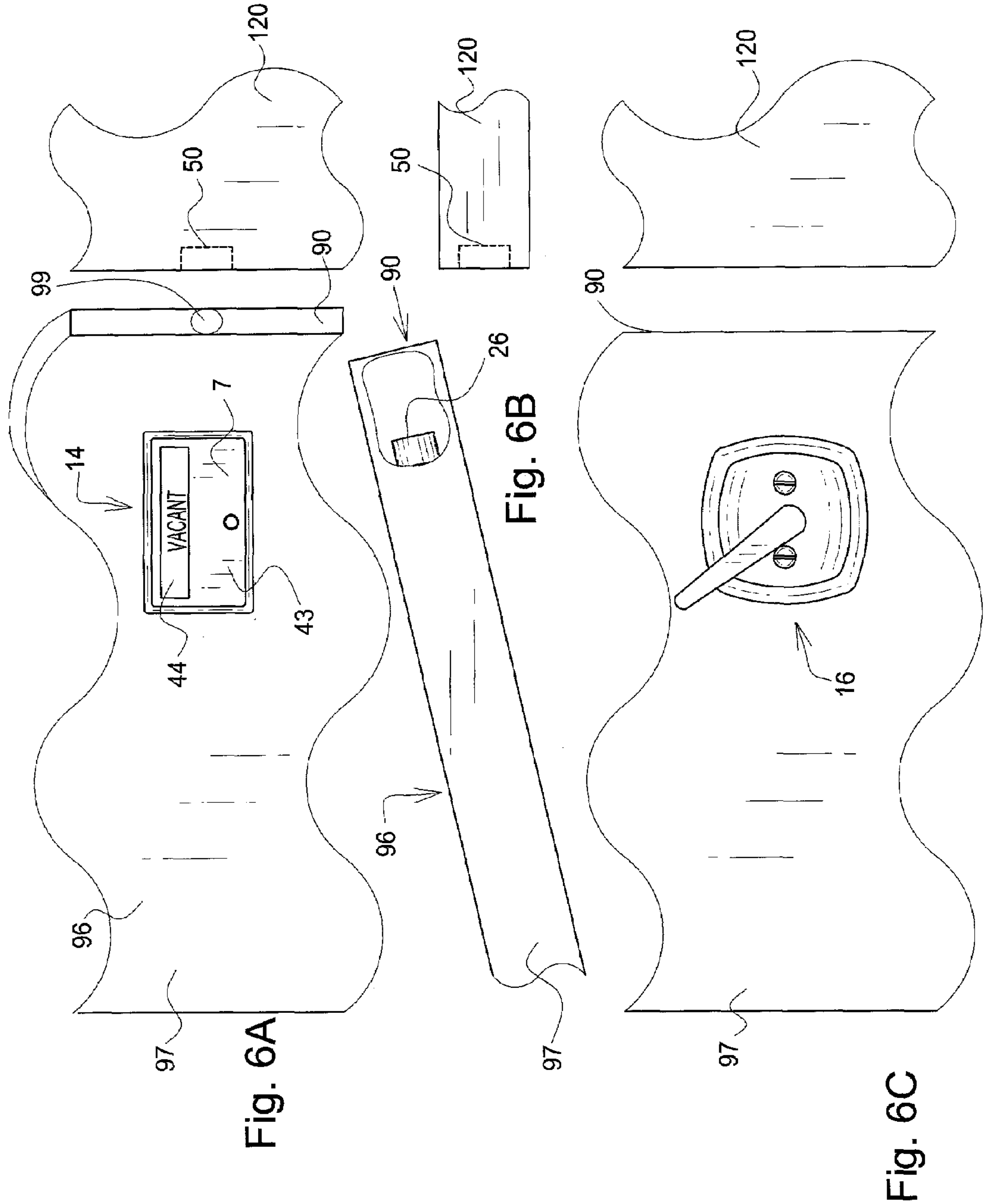
FIG. 6A is a front view of a portion of a doorjamb having a strikeplate and a door having an occupied indicator, the door being in an open position and the signaling device showing a vacant position according to one embodiment of the invention.
FIG. 6B is a top view of a portion of a doorjamb having a strike plate and a door having an occupied indicator, the door being in an open position and the magnet shown in a retracted position according to one embodiment of the invention.
FIG. 6C is a rear view of a portion of a doorjamb having a strikeplate and a door having an occupied indicator, the door being in an open position and the knob turned to a vacant position according to one embodiment of the invention.

The signal apparatus extension portion 15 is rotatable, extending to the interior of the signaling device 14 in one embodiment, between the front side 7 and the back side 11. The front side is best shown in FIGS. 5A and 6A. Operatively coupled to one embodiment's signal extension at the interior of the signaling device may be an "occupied" sign. The sign is adapted to be displayed when the switching apparatus is moved to the "occupied" position. For example, a cam may be coupled or integrated to the rotatable extension on the interior of the signaling device, and when the shank 18 rotates the extension, the cam moves the occupied sign from a hidden position behind a front plate 43 and below a front window 44, to a viewable position. Sometimes the viewable position is in front of a vacant sign which may be typically displayed when the occupied sign is not displayed.

The signaling device 14 may not have occupied and vacant signs. The signaling device may be capable of indicating other status levels such as, but not limited to, a green light and a red light. The signaling device may also provide a sound. The display signs or the status levels may also be referred to as a "state". A signaling device in one embodiment is capable of indicating at least two states. On version displays each of at least two states individually, although some overlap may occur changing from one display state to another. For example, the vacant sign may be a first state, and an occupied sign may be a second state. As the state is switched from the vacant sign to the occupied sign, or vice versa, both signs may be at least partially displayed at the same time. More than two states may also be displayed—simultaneously or otherwise.

Figure 8:
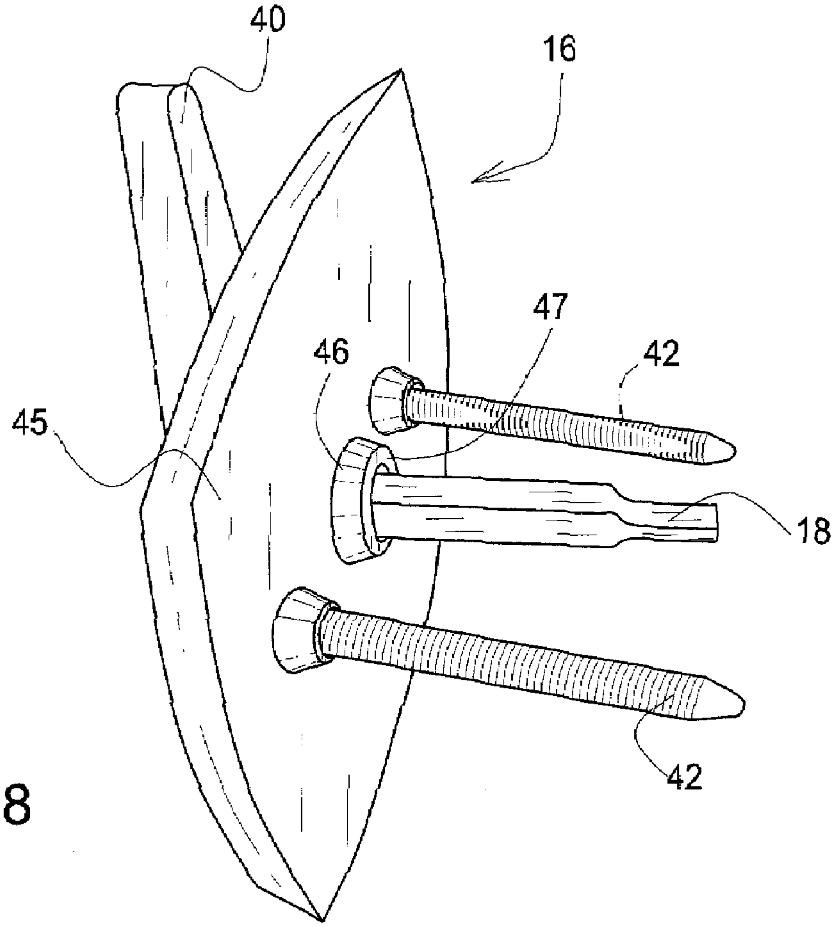
FIG. 8 is an isometric view of a switching apparatus with a coupled shank and two screws according to one embodiment of the invention.

As best shown in FIGS. 4 and 8, the switching apparatus 16 may be comprised of a knob 40, a plate 45 and a pair of bolts 42. The plate may be coupled to a door inner surface. The knob may also be a lever. Integrated to the knob may be a knob portion 46 which extends through the switching apparatus plate, as best shown in FIG. 8. The knob portion may extend from an end of the knob, and may be integrated or coupled to the knob. The knob portion may couple to the plate in a manner where the knob may rotate around the plate. At a distal end of the knob portion may be a hole 47 adapted to receive a second end of the shank 18 so that the shank may be rotated when the knob is rotated. Other switching apparatus such as, but not limited to, an electronic switching apparatus are also contemplated.

In one embodiment, the switching apparatus 16 may be turned from a first position to a second position. The first position may be a vacant position and the second position may be an occupied position. The apparatus may be a knob or a lever which may be turned from the first position to the second position. The switching apparatus may also be a toggle switch, with one toggle switch adapted to operatively couple to an electronic device.

One embodiment's switching apparatus 16 is adapted to be located in a first position when the door is open and when the door is initially closed—prior to enabling the switching apparatus to the second position. When the shank 18 is coupled to the switching apparatus in one embodiment, as the knob 40 is turned, the shank is turned. If the shank is also coupled to the bearing 22, the bearing will turn with the shank. The bearing in one embodiment will then rotate the bearing arm 24, which in turn longitudinally extends the lever 25. The lever, being coupled to the magnet 26 in one embodiment, extends the magnet in a direction which is generally along the longitudinal axis of the housing 12.

As a shank 18 second end is coupled to the signaling device 14 in one version, the signaling device is also engaged when the shank rotates. For example, if the switching apparatus 16 moves from a fist position to a second position, the signaling device may move from a fist indication state to a second indication state. The first indication state may be a vacant sign and the second indication state may be an occupied sign.

When the door is closed and the magnet 26 is extended, the magnet is held in an extended position, as best shown by FIG. 1C, by magnetic force between the magnet and a strikeplate 50, as best shown in FIG. 5B. A strikeplate 50 may be placed within the door jamb, or on the door jamb surface, proximate to the location that the magnet is positioned next to the edge of the door, as best shown in Figures. When the door is opened, the magnet is pulled back into the retracted position as best shown by FIG. 1A and 6B by the biasing mechanism. For example, a compression spring 27 may be coupled to the housing 12 and the magnet such that when the switching apparatus 16 is not manually or otherwise held in the second position, or there is no magnetic force holding the magnet in the extended, or second, position, the magnet is pulled back by the spring.

A SECOND EMBODIMENT OF AN OCCUPIED INDICATOR

As best shown in FIGS. 10-17, a second embodiment of an occupied indicator 10 is shown, comprising a switching apparatus 16, a signaling device 14, and a bolt assembly 100. The switching apparatus in one version may have a plate 45 with a knob 40 or lever coupled to a front side of the plate. Coupled or integrated to the knob may be a portion extension generally similar to the portion extension in the first embodiment. However, the knob portion extension in the second embodiment may or may not include a hole. In one version, the knob portion extension may extend through the plate, being integrated or coupled to a rotatable disc 101 on the back side 11 of the plate. The rotatable disc may simply be referred to as a disc or may also be referred to as a dial. When the switching apparatus is moved from a first position or state to a second position or state, in one embodiment the disc may be rotated. The disc may also be operatively coupled to an electronic switching apparatus.

Coupled to the disc 101 in one embodiment may be a signaling apparatus biasing mechanism 102 such as, but not limited to, a spring. The spring is a tension spring in one version adapted to return the disc to a first position, which may be a vacant position in one embodiment. Also coupled or integrated to the disc may be a connection arm 103. In one embodiment, the connection arm is coupled or integrated to the disc proximal a disc edge.

Figure 10:
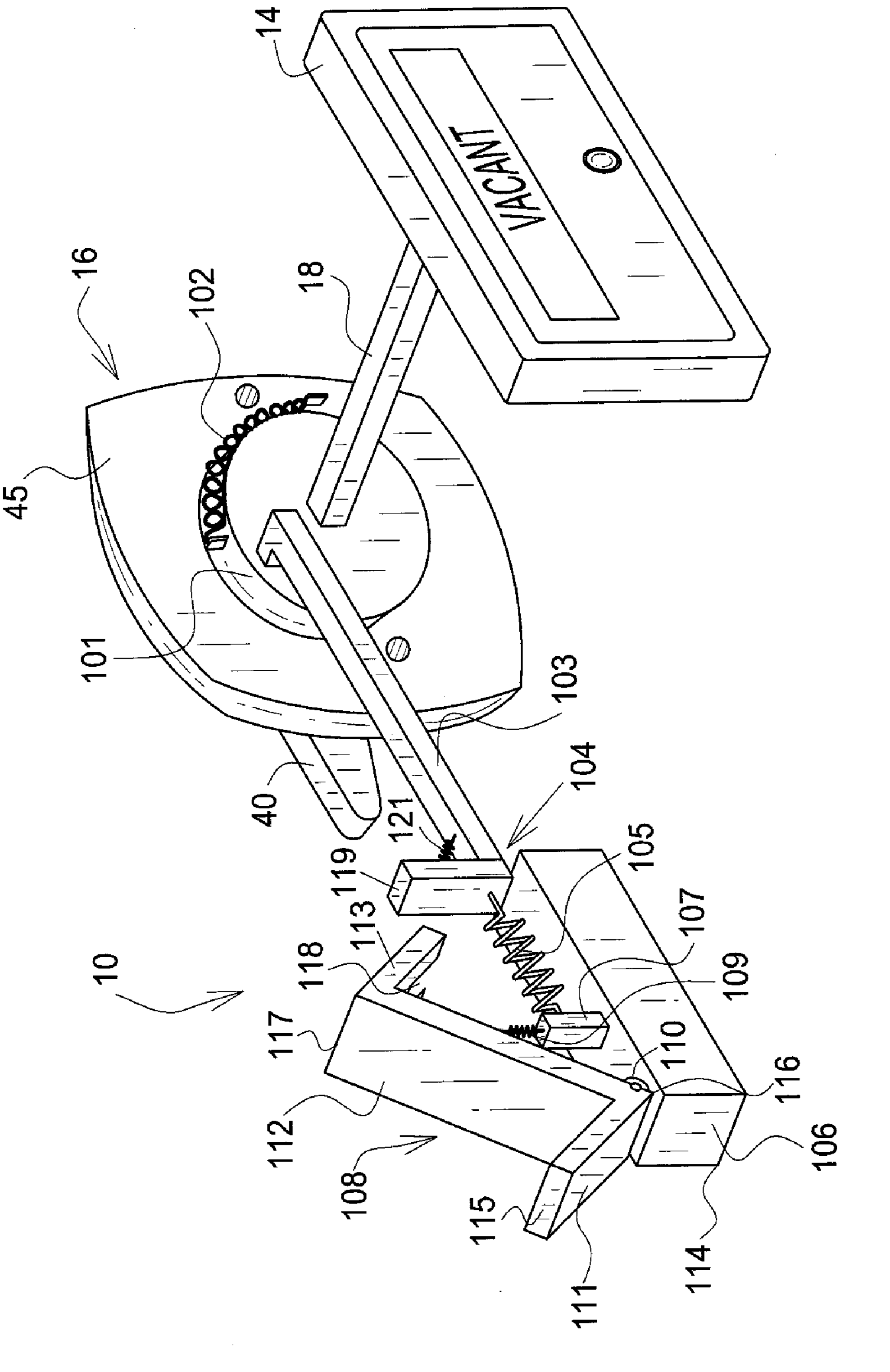
FIG. 10 is an isometric view of an occupied indicator having a latch-spring bolt assembly according to one embodiment of the invention.

The connection arm 103 may have a distal end 104. The distal end is coupled or integrated to bolt assembly 100 in one version. The connection arm may be coupled to a bolt biasing mechanism 105 such as, but not limited to, a generally horizontal spring. In one version, the connection arm is coupled to a spring first end, with a spring second end being coupled to the bolt 106. The bolt may have a generally rectangular cross-section, or may have another cross-sectional geometry such as, but not limited, to a generally circular cross-section. The spring second end may also be coupled to a bolt extension 107, as best shown in FIG. 10. One of either the bolt or the bolt extension may also couple to a trigger hammer biasing mechanism 109 such as, but not limited to, a generally vertical spring, which may also be coupled to a trigger hammer 108. The bolt assembly may have a generally longitudinal axis which is generally aligned with a longitudinal axis of the connection arm, bolt biasing mechanism, and bolt. Other biasing mechanisms which may be used in the second embodiment or in other embodiments may include items such as, but not limited to, pistons and piston-type devices or hinges.

The trigger hammer 108 is a generally "Z-shaped" device in one version and may either be operatively coupled to the bolt assembly 100 or may be referred to as part of the bolt assembly. The trigger hammer may be coupled to the bolt assembly through the trigger hammer biasing mechanism 109 or through a hinge 110. In one embodiment, the trigger hammer has a first portion 111, a second portion 112, and a third portion 113. The first portion may extend generally upwardly and longitudinally outwardly from a bolt distal end 114. The first portion may have a first end 115 and may be integrated to the second portion at a first portion pivot edge 116. The first portion pivot edge may rest on the bolt and may be couple to the hinge. The second portion may extend from the first portion pivot edge upwardly and longitudinally inwardly from the bolt distal end, ending at, and integrated to, the third portion at a third portion pivot edge 117. The third portion may extend downwardly and inwardly towards the bolt. The third portion may also have a notch 118. The notch may be adapted to allow a connection arm extension 119 slide under the hammer.

In one version of the second embodiment, the disc 101 on the switching apparatus 16 may also be coupled to a shank 18. The shank in one second embodiment is generally similar to the shank in the first embodiment. The shank may be coupled to the signaling device 14 and switching apparatus 16 in a manner generally similar to the shank coupling to the switching apparatus 16 and signaling device in the first embodiment. For example, the shank may be inserted into a hole in the disc, and may also be inserted into a hole in a signaling device extension portion 15—such as the signaling device extension shown in FIG. 7. The extension may also include the cam as described in the first embodiment. In one version, similar to a first embodiment version, as the knob 40 on the switching apparatus 16 is turned, the shank 18 is also rotated and the cam on the signaling device 14 is rotated. The cam is coupled or integrated to an occupied sign in one version, thereby the "occupied" sign is displayed in front of the vacant sign. Other signaling devices, as described in the first embodiment may also be used in the second embodiment.

In one version, a switching apparatus plate 45 is coupled to an inner door surface, with the dial 101, shank 18, and connection arm 103 extending within a door interior. Similar to the first embodiment, the inner door surface may include a bore which the dial, shank and a portion of the connection arm may fit within. A door side surface may include a hole 99 which may intersect the bore, similar to the hole in the door side surface shown in FIG. 6A. When the knob 40 is rotated in one second embodiment, the connection arm 103 is also moved. In one version, the connection arm is moved in a direction which is generally parallel to the longitudinal axis of the arm, which is also generally parallel to the longitudinal axis of the hole. By the arm being operatively coupled to the bolt assembly 100, with the bolt assembly resting on a bore lower surface 98, as best shown in FIG. 11, when the arm is moved in a generally longitudinal direction, the bolt assembly is likewise moved in a similar general longitudinal direction.

In one embodiment, the connection arm extension 119 is coupled to the bolt biasing mechanism 105. Whatever type of biasing mechanism is used (such as, but not limited to, a spring, piston, etc.), the biasing mechanism is adapted contract under a load greater than the coefficient of friction between a bottom surface of the bolt 106 or bolt assembly 100 and the bore lower surface 98. Therefore, in one embodiment, as the switching apparatus is activated (which may or may not be by rotation of a knob or other similar device), the connection arm 103 is moved. The bolt assembly then slides along the bore lower surface in a direction generally parallel to the bore longitudinal axis.

Figure 11:
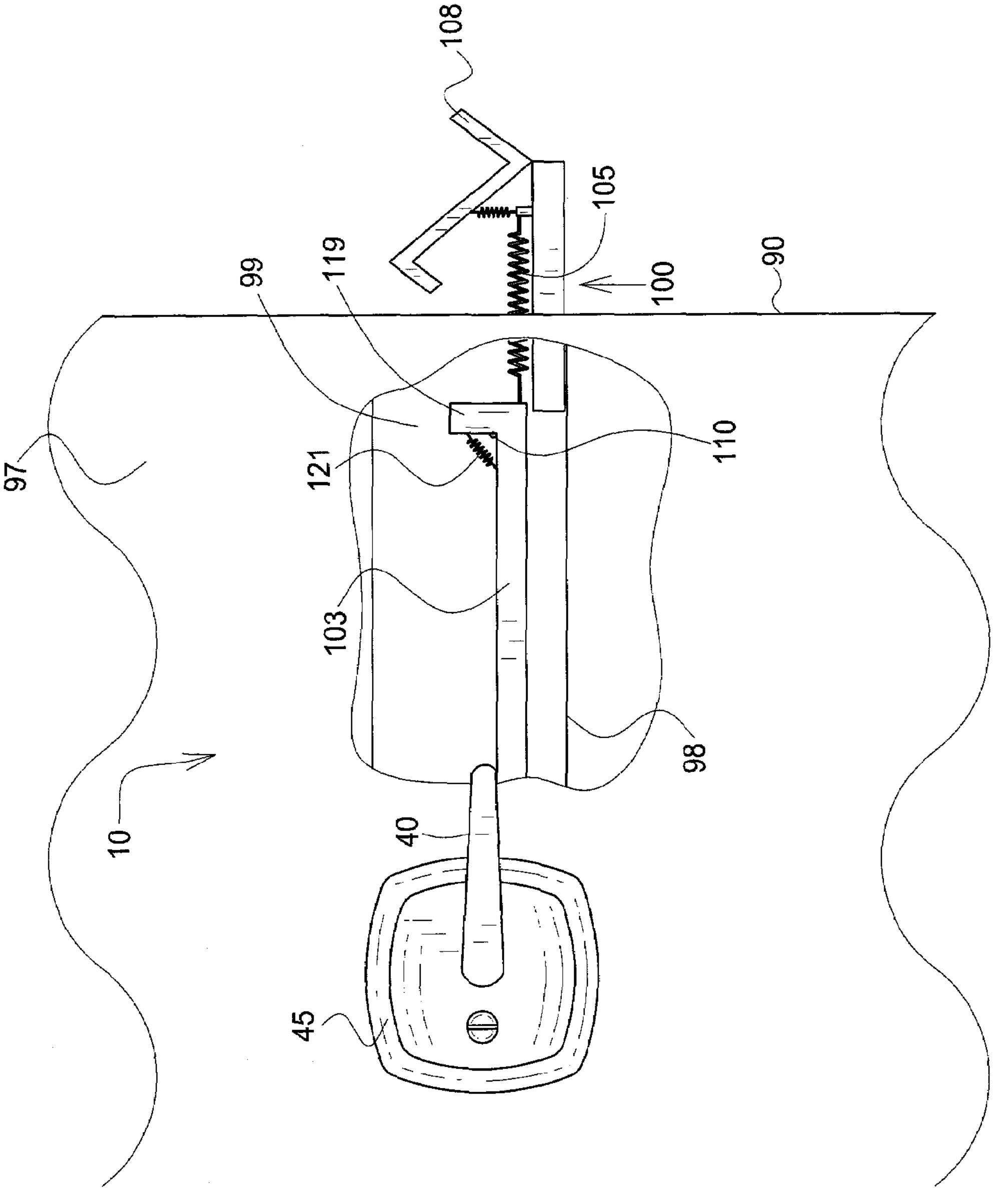
FIG. 11 is a side view of an open door with a cutaway showing a coupled occupied indicator in an extended position according to one embodiment of the invention.
Figure 12:
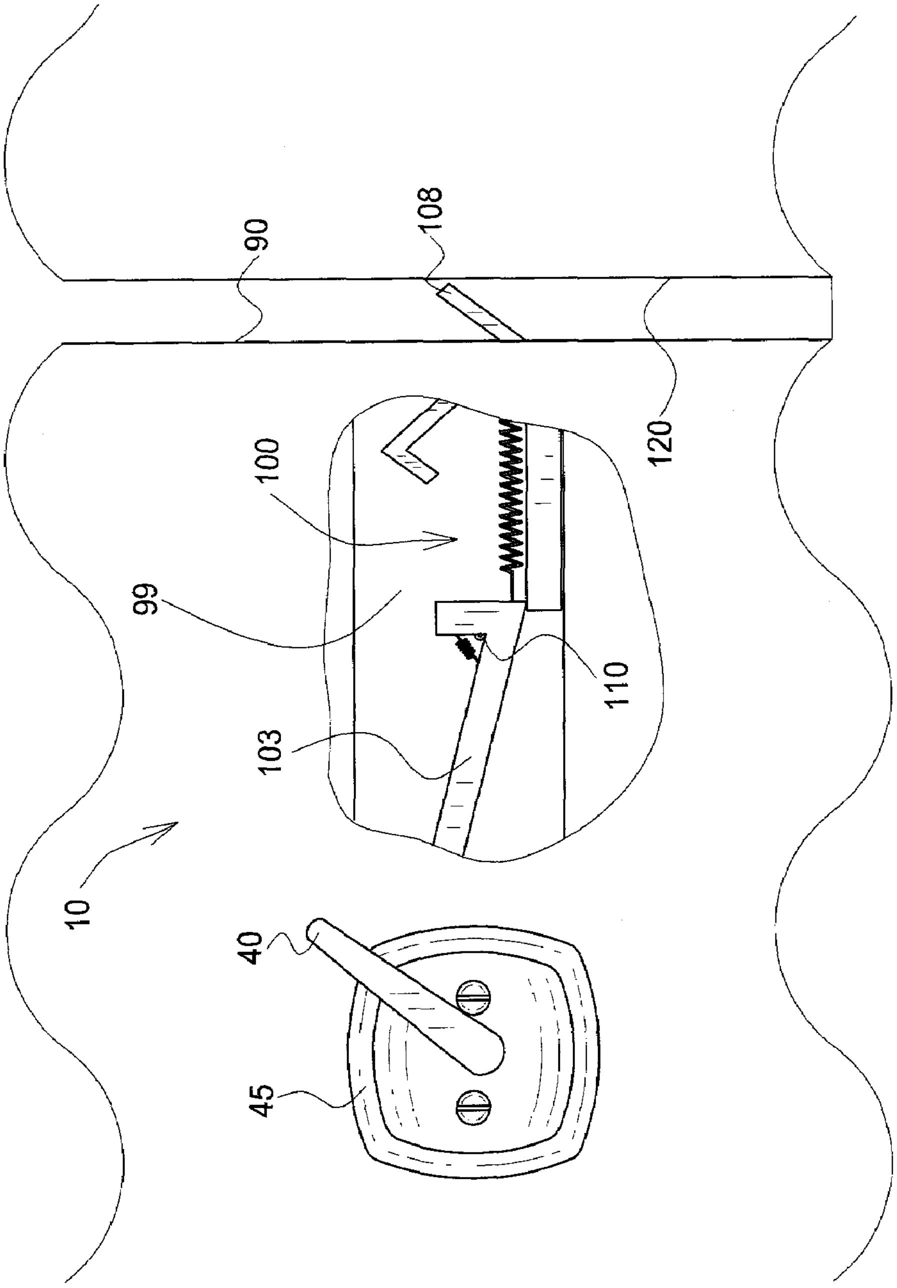
FIG. 12 is a side view of a closed door and doorjamb with a cutaway showing an occupied indicator is a vacant, retracted position according to one embodiment of the invention.
Figure 13:
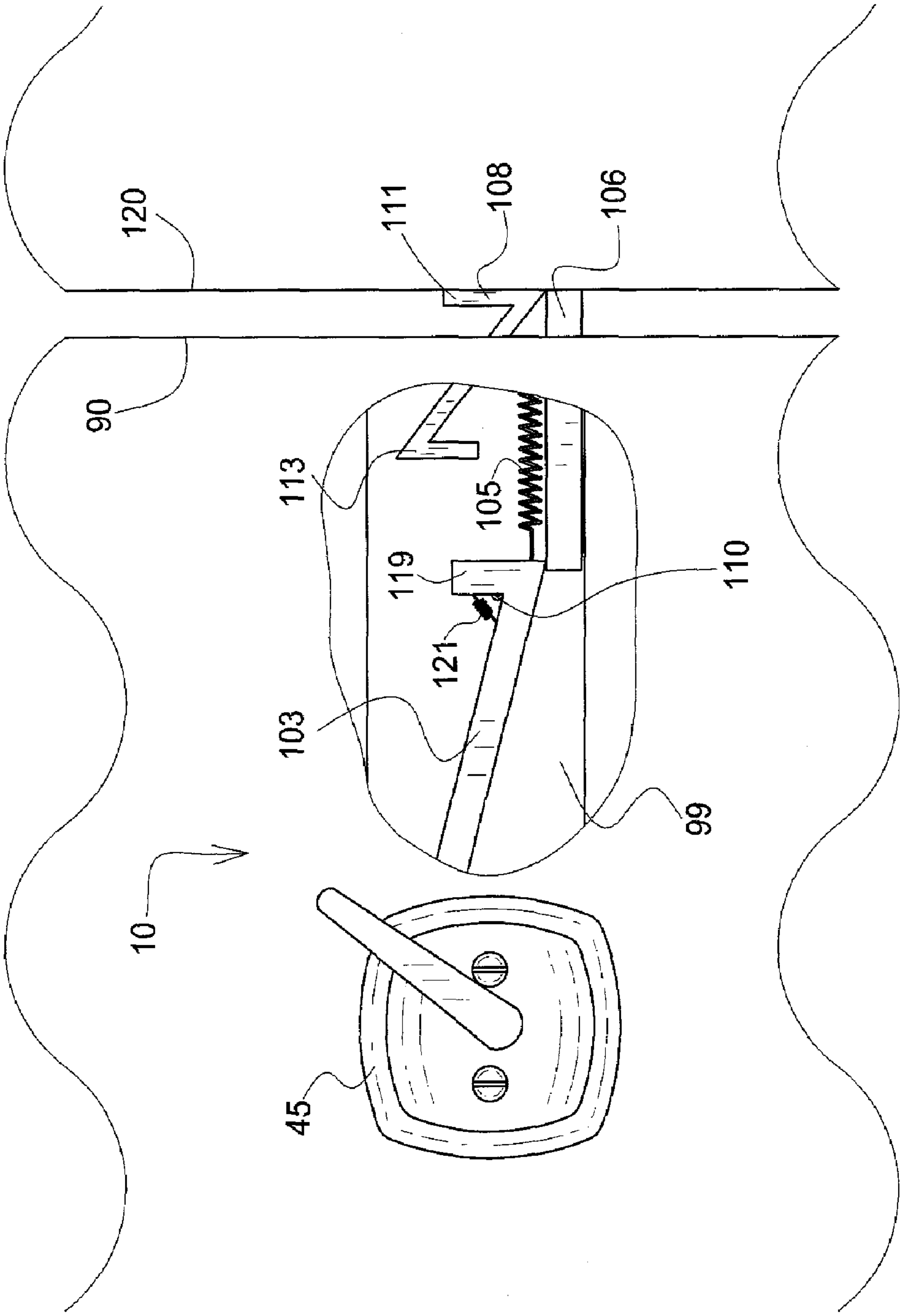
FIG. 13 is a side view of a closed door showing a coupled occupied indicator in a position between a vacant and occupied position, with a cutaway showing the connection arm extended to a position engaging a trigger hammer in a flush position with a door jamb according to one embodiment of the invention.
Figure 14:
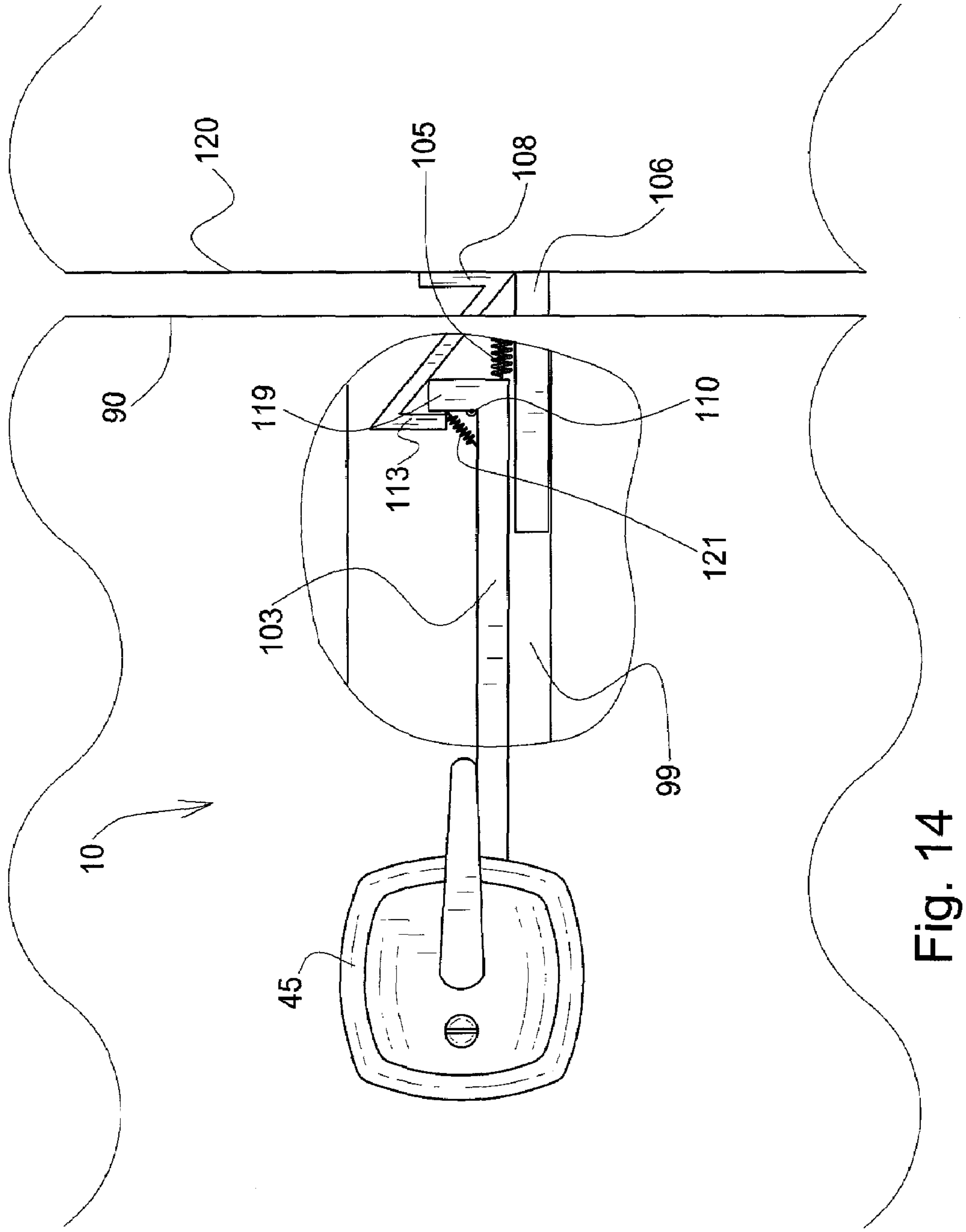
FIG. 14 is a side view of a doorjamb and door with a cutaway showing an occupied indicator in an occupied position, according to one embodiment of the invention.
Figure 15:
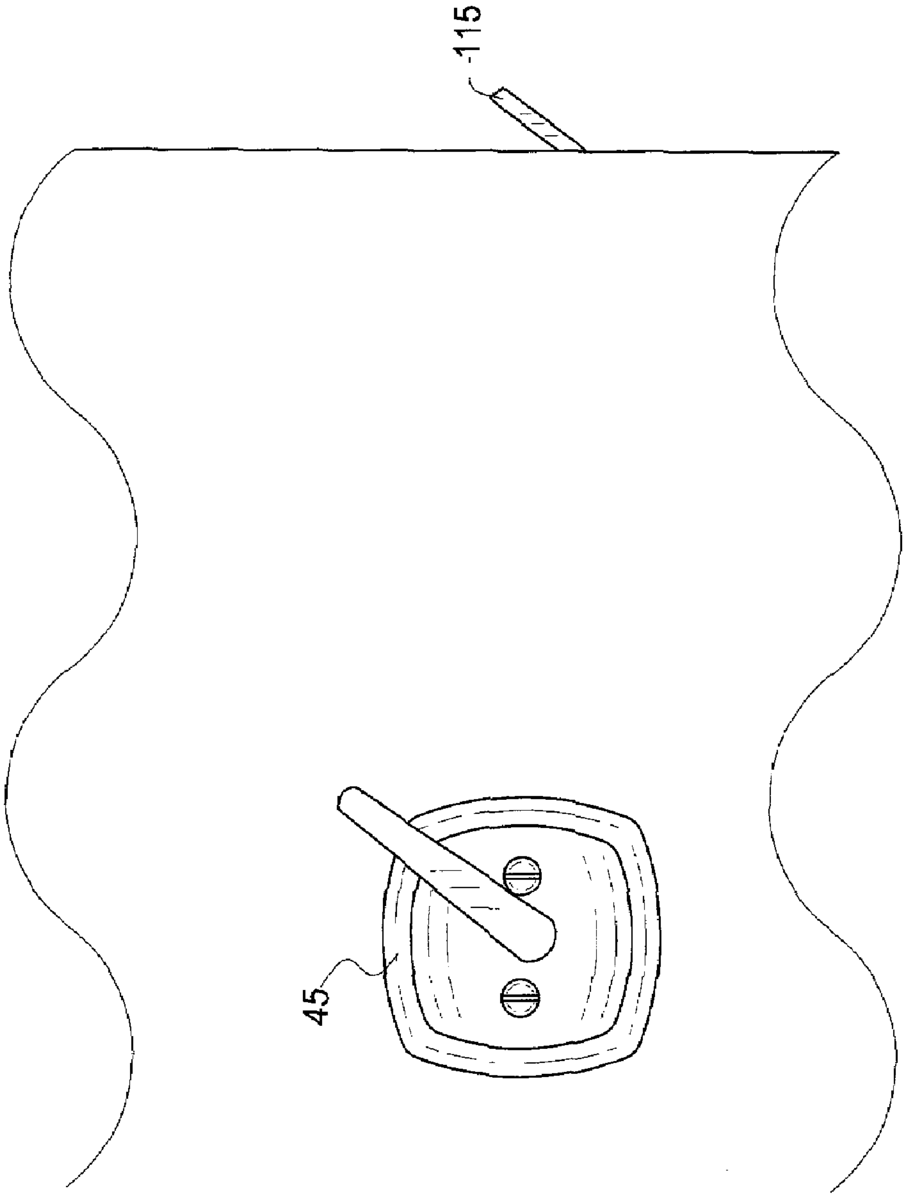
FIG. 15 is a side view of a door without a cutaway in an open position showing a first portion of the trigger hammer extending away from a door side according to one embodiment of the invention.

When the door 97 is in an open position, similar to FIG. 6B, and the connection arm 103 is moved, as best shown in FIG. 11, the bolt assembly 100 may extend away from a door outer edge 90. When the door is closed, similar to FIG. 5B, and the connection arm is extended towards the door edge 90, the bolt assembly will extend away from the door edge 90 until the trigger hammer 108 contacts the doorjamb 120, as best shown in FIG. 12. At that point, the connection arm continues to push the bolt assembly towards the door jamb, with the trigger hammer pivoting on the bolt 106 until the trigger hammer first portion 111 is generally parallel with a door jamb side edge, as best shown in FIG. 13. In one embodiment, when the door is closed, the doorjamb may be flush with a door side edge. In such an embodiment, the trigger hammer is generally parallel with the doorjamb upon closing the door, similar to FIG. 13, and the bolt assembly generally does not extend away from the door edge.

At this point, the connection arm 103 may continue its movement towards the door edge 90, moving towards the trigger hammer 108 and in one embodiment sliding along a top surface of the bolt 106 to do so. When the connection arm extension 119 comes into contact with the trigger hammer third portion 113, the connection arm extension is able to travel past the third portion. In one embodiment, this occurs because the extension is coupled to the connection arm through a biasing mechanism such as, but not limited to, a spring 121. The extension may also be coupled to the connection arm through a hinge 110.

Therefore, as the extension 119 contacts the third portion 113 and the connection arm 105 continues to extend towards the door edge 90, a portion of an extension bottom edge may also continue towards the door edge, with an extension top edge pivoting on the third portion, compressing the biasing mechanism 109, and rotating on the hinge 110. As the bottom edge continues to generally travel towards the door edge, the extension continues to pivot on the third portion, with the extension top edge sliding down and eventually under the third portion. At a point where the entire extension top edge has slid past the third portion, the extension may extend back up in a position generally perpendicular to the connection arm. At this point, the switching mechanism may be released, with the bolt biasing mechanism 105 pulling the extension arm against the trigger hammer third portion. At the same time, in one embodiment, the trigger hammer biasing mechanism 109, as best shown in FIGS. 10 and 11, pushes the trigger hammer against the door jamb. When the door is opened, the trigger hammer biasing mechanism enables the trigger hammer to pivot so that the trigger hammer first portion 111 extends outward from the door side edge and the third portion 113 moves upward, thereby releasing the connection arm, and allowing the switching apparatus 16 to return to the first position. The switching apparatus is returned to the first position by the signaling apparatus biasing mechanism 102.

One Method of Displaying Room Occupancy Status:

As best shown in FIGS. 5A through 6C and 16A through 17C, a method of displaying room occupancy status comprises closing a door 97, moving a switching apparatus 16 from a first position to a second position, and displaying an occupancy status on a door outer surface 96. In one method, the door has an occupancy indicator which includes a bolt assembly and includes moving the bolt assembly from a first position to a second position. In one method version, the first or second positions of the bolt assembly or switching apparatus are different positions. A method version also includes the additional step of opening the door. In such a version, opening the door automatically returns the bolt assembly and from the second position to the first position.

One method may have a bolt assembly which may include a magnet 26. A strikeplate may also be used on the method, as best shown in FIGS. 5A through 6C. A method's strikeplate may be magnetized and may include a magnet which is not magnetized, but is a material which may create a magnetic field with the magnetized strikeplate. As best shown in FIG. 5C, when the door 97 is closed, the switching apparatus 16 may be moved to the second position. The switching apparatus may be a lever or a knob 40 operatively coupled to a plate 45, with a knob portion extending into the interior of the door. As best shown in FIG. 5B, moving the switching apparatus to the second position may position the magnet proximal a door edge 90, such as, but not limited to, a door side edge. The magnet may be operatively coupled to the switching apparatus and may be operatively coupled through a bolt assembly having mechanical linkage such as, but not limited to, a bearing which may be integrated to an arm which, in turn, may be coupled to a lever. The door edge may be proximal to a door jamb 120. Other door edges may be used. Also, other operatively coupled mechanisms are also contemplated.

The switching apparatus 16 may also be coupled to a signaling device 14. A shank may be used to couple to two items. The signaling device may display a plurality of signals. In one method, the signaling device may display a sign with the words "occupied" and a sign with the words "vacant". In one method, when the switching apparatus is in the second position, as best shown in FIG. 5C, the signaling device displays the occupied sign, as best shown in FIG. 5A.

As best shown in FIG. 6B, when the door is opened, the magnet 26 slides to a retracted position away from the door edge 90. This may happen due to the loss of magnetic force between the magnet and the strikeplate 50. The magnet is pulled to the retracted position through a biasing mechanism such as, but not limited to, a spring 27, as best shown in FIG. 5B. The spring may be operatively coupled to the switching apparatus such that when the switching apparatus is placed in the second position, a load is created in the spring (or other biasing mechanism). When the magnet is released, a first state is displayed on the signaling device, as best shown in FIG. 6A showing the vacant sign, and the switching apparatus is moved to the first position as best shown in FIG. 6C.

Figures 16A, 16B, 16C:
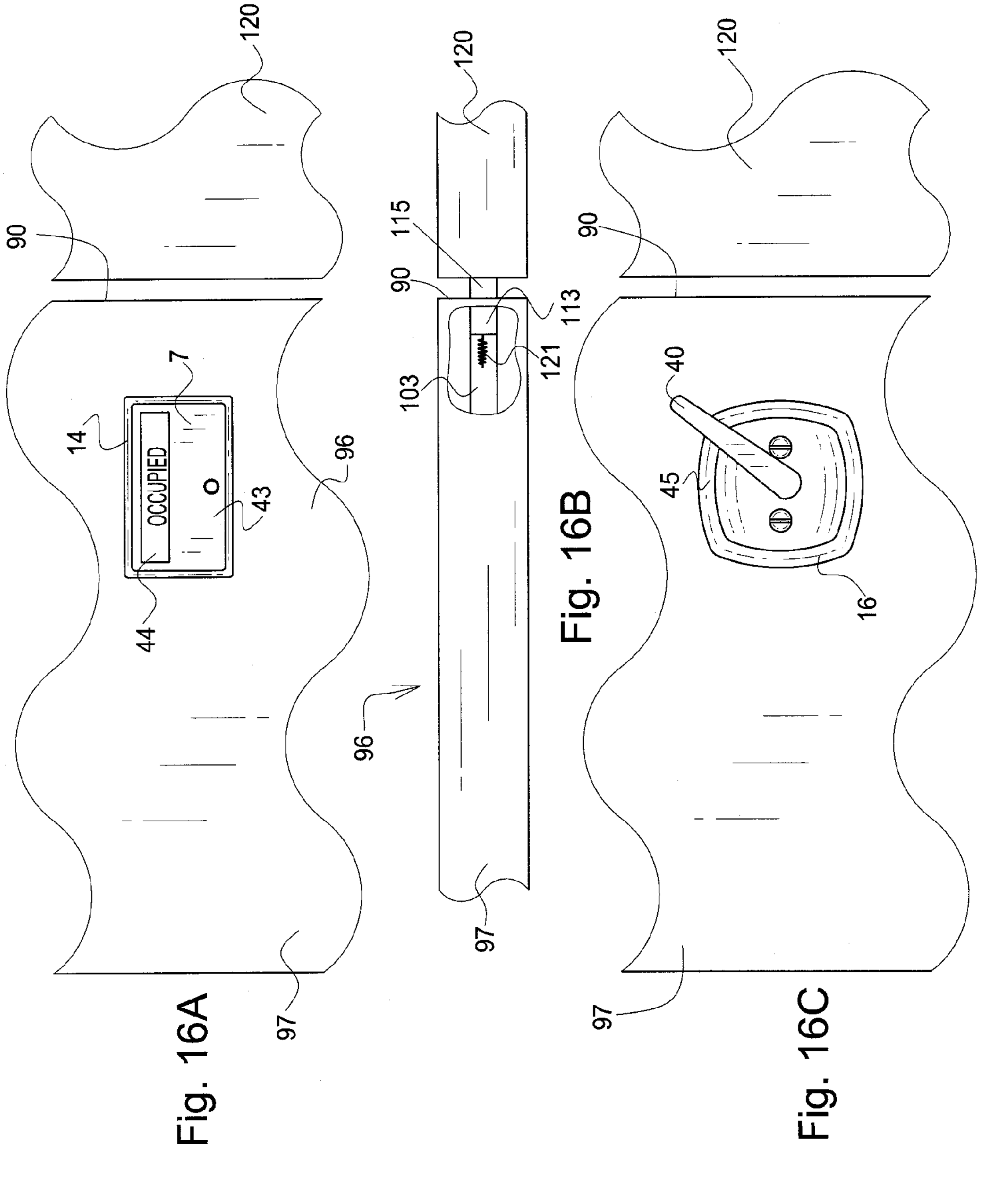
FIG. 16A is a front view of a portion of a doorjamb and a door having an occupied indicator, the door being in a closed position and the indicator showing an occupied sign according to one embodiment of the invention.
FIG. 16B is a top view of a portion of a doorjamb and a door having an occupied indicator, the door being in a closed position and the connection arm, bolt assembly, and trigger hammer being shown in a cut-away in an extended position according to one embodiment of the invention.
FIG. 16C is a rear view of a portion of a doorjamb and a door having an occupied indicator, the door being in a closed position and the knob turned to an occupied position according to one embodiment of the invention.

Instead of including a magnet 26, the method may include a trigger hammer. As best shown in FIG. 16B, in one method, when the door 97 is closed and the switching apparatus is in an occupied position, the connection arm 103 may be in an extended position. One method may have the connection arm extended generally towards a door side edge 90. The third portion 115 of the trigger hammer may be pressed against the door jamb 120, with the first portion 113 of the trigger hammer holding a connection arm extension to keep the connection arm from being returned to the retracted position by a biasing mechanism. A connection arm biasing mechanism such as, but not limited to, a spring 121, is also shown in FIG. 16B. When the connection arm is in the extended position, occupied state may be shown on the signaling device, as best shown in FIG. 16A, and the switching apparatus may be in an occupied state as well, as best shown in FIG. 16C.

Figures 17A, 17B, 17C:
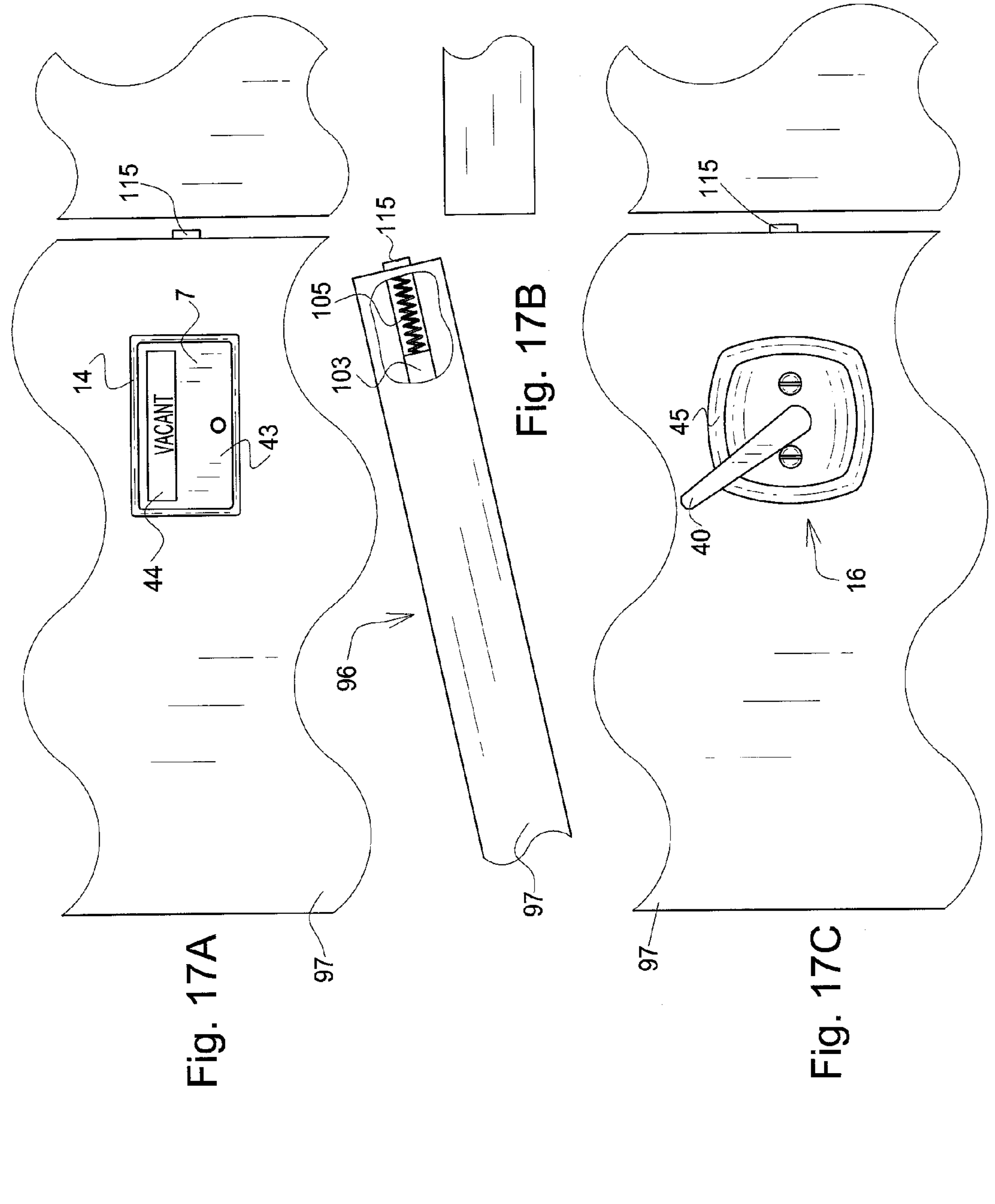
FIG. 17A is a front view of a portion of a doorjamb and a door having an occupied indicator, the door being in an open position and the switching apparatus showing a vacant position according to one embodiment of the invention.
FIG. 17B is a top view of a portion of a doorjamb and a door having an occupied indicator, the door being in an open position and having a cut-away showing the connection arm and bolt assembly in a retracted position according to one embodiment of the invention.
FIG. 17C is a rear view of a portion of a doorjamb and a door having an occupied indicator, the door being in an open position and the knob turned to a vacant position according to one embodiment of the invention.

Upon opening the door in one method, the connection arm 103 may be returned to a retracted position, as best shown in FIG. 17B. This may also cause the signaling device and switching apparatus to return to their vacant states, as best shown in FIGS. 17A and 17C. Returning the connection arm to the retracted position may be performed by unloading a biasing mechanism or releasing a trigger hammer.

Other Embodiments and Variations

The embodiments of the occupancy indication device and methods as illustrated in the accompanying figures and described above are merely exemplary and are not meant to limit the scope of the invention. It is to be appreciated that numerous variations to the invention have been contemplated as would be obvious to one of ordinary skill in the art with the benefit of this disclosure.

I claim:

1. An occupancy indicator comprising:

a housing;

a magnet;

a lever;

an arm;

a switching apparatus activatable by a person;

a signaling device adapted to indicate one of at least two states;

a biasing mechanism; and wherein, a first end of the lever is operatively coupled to the magnet and a second end of the lever is coupled to a first end of the arm; a first end of the biasing mechanism is operatively coupled to the magnet and a second end of the biasing mechanism is operatively coupled to the housing; a second end of the arm is operatively coupled to the switching apparatus; and the arm being operatively coupled to the switching apparatus whereby a movement of the arm will cause the signaling apparatus to change the signaling device from one of the at least two signaling states to an other.

2. The occupancy indicator of claim 1 wherein, the biasing mechanism is a spring; and the switching apparatus includes a knob.

3. The occupancy indicator of claim 2 wherein the switching apparatus further includes:

a radial bearing; and a shank; wherein the radial bearing is operatively coupled to the second end of the arm; the radial bearing is operatively coupled to a middle portion of the shank; a first end of the shank is operatively coupled to the knob; and a second end of the shank is operatively coupled to the signaling device.

4. The occupancy indicator of claim 1 in combination with a door and a door jamb wherein, the magnet, the biasing mechanism, and the housing reside within the door when installed, and the biasing mechanism automatically positions the magnet proximal the housing in a retracted position upon the door opening and breaking magnetic attraction between the magnet and the door jamb.

5. The combination of claim 4 further including:

a magnet reception cavity, the magnet reception cavity being coupled to the housing proximal the magnet; and a strikeplate, the strikeplate being of ferromagnetic material and positioned proximal the magnet when the door is closed.

6. A combination comprising:

a door, the door comprising an outer door surface, an inner door surface, and at least one side edge door surface;

an occupancy indicator comprising a switching apparatus, a bolt assembly including at least one biasing mechanism, and a signaling device, the occupancy indicator not being associated with a lock and being adapted to automatically provide a signal upon the door opening, wherein a bolt of the bolt assembly includes one of a magnet and a ferromagnetic material;

a door jamb; and a strikeplate, wherein the strikeplate includes an other of the magnet and the ferromagnetic material; wherein, the signaling device is coupled to the outer door surface, the switching apparatus further includes a knob coupled to the inner door surface, the biasing mechanism provides a force substantially opposite a magnetic force between the bolt and the strikeplate, and the bolt assembly is adapted to extend towards the at least one side edge door surface and retract to a non-extended position upon the door opening.

7. The combination of claim 6 wherein, the bolt assembly further includes at least one biasing mechanism and is operatively coupled to the switching apparatus and the signaling device;and the door further includes:

at least one bore through the outer door surface and inner door surface, and a hole in the at least one side edge door surface, the hole intersecting with the at least one bore.

8. A method of displaying an occupancy status for a room using an occupancy indicator, the occupancy indicator comprising, (i) a housing, (ii) a bolt made of one of a magnet and a ferromagnetic material, (iii) a lever, (iv) an arm, (v) a switching apparatus activatable by a person, (vi) a signaling device adapted to indicate one of at least two states, and (vii) a biasing mechanism, the method comprising:

closing a door having the occupancy indicator;

displaying a first occupancy status on a door outer surface when the switching apparatus is in a first position;

loading the biasing mechanism from a door inner surface by moving the switching apparatus from the first position to a second position whereby moving the bolt proximal a door edge;

displaying a second occupancy status on the door outer surface when the switching apparatus is in the second position; and holding the second position of the switching apparatus by magnetic attraction of the bolt and a strikeplate made of an other of the magnet and the ferromagnetic material against a biasing of the biasing mechanism.

9. The method of claim 8, further comprising:

opening the door having the occupancy indicator;

unloading the biasing mechanism by eliminating the magnetic attraction of the bolt and the strikeplate upon said opening of the door whereby moving the switching apparatus from the second position to the first position and moving the bolt distal the door edge automatically occurs from the biasing of the biasing mechanism.

10. The method of claim 9, wherein the biasing mechanism is a spring.

11. The method of claim 9, wherein said moving the switching apparatus further includes turning a knob.

* * * * *